(12) United States Patent
Aksela

(10) Patent No.: US 11,811,788 B2
(45) Date of Patent: Nov. 7, 2023

(54) METHOD OF THREAT DETECTION IN A COMPUTER NETWORK SECURITY SYSTEM

(71) Applicant: F-Secure Corporation, Helsinki (FI)

(72) Inventor: Matti Aksela, Helsinki (FI)

(73) Assignee: WITHSECURE CORPORATION, Helsinki (FI)

( * ) Notice: Subject to any disclaimer, the term of this patent is extended or adjusted under 35 U.S.C. 154(b) by 377 days.

(21) Appl. No.: 16/810,988

(22) Filed: Mar. 6, 2020

(65) Prior Publication Data

US 2020/0287916 A1 Sep. 10, 2020

(30) Foreign Application Priority Data

Mar. 7, 2019 (GB) ...................... 1903035

(51) Int. Cl.
*H04L 9/40* (2022.01)
*G06N 20/00* (2019.01)
*G06N 3/08* (2023.01)
*G06N 5/048* (2023.01)
*G06F 18/214* (2023.01)
*G06F 18/243* (2023.01)
*G06N 7/01* (2023.01)

(52) U.S. Cl.
CPC ...... *H04L 63/1408* (2013.01); *G06F 18/2148* (2023.01); *G06F 18/24323* (2023.01); *G06N 3/08* (2013.01); *G06N 5/048* (2013.01); *G06N 7/01* (2023.01); *G06N 20/00* (2019.01); *H04L 63/0227* (2013.01); *H04L 63/1416* (2013.01); *H04L 63/1425* (2013.01); *H04L 63/1433* (2013.01); *H04L 63/1441* (2013.01); *H04L 63/20* (2013.01)

(58) Field of Classification Search
CPC ............ H04L 63/1416; H04L 63/0227; H04L 63/1425; H04L 63/1433; H04L 63/1441; H04L 63/20; G06N 20/00; G06N 3/08; G06N 5/048; G06N 7/005; G06K 9/6257; G06K 9/6282
See application file for complete search history.

(56) References Cited

U.S. PATENT DOCUMENTS

| | | | |
|---|---|---|---|
| 10,673,880 B1 * | 6/2020 | Pratt | G06F 21/554 |
| 10,887,330 B2 * | 1/2021 | Christian | H04L 63/1425 |
| 11,057,409 B1 * | 7/2021 | Bisht | H04L 43/04 |
| 2014/0007238 A1 | 1/2014 | Magee et al. | |
| 2015/0215334 A1 | 7/2015 | Bingham et al. | |

(Continued)

OTHER PUBLICATIONS

Search Report issed for application GB1903035.2, dated Jul. 26, 2019.

*Primary Examiner* — Stephen T Gundry
(74) *Attorney, Agent, or Firm* — Thomas | Horstemeyer, LLP

(57) ABSTRACT

A method comprising: receiving raw data related to one or more network nodes, wherein dissimilar data types are aligned as input events; filtering one or more of the input events by using an adjustable threshold that is based on a filtering score, wherein the filtering score is an estimate of the likelihood that the input event is followed by a security related detection; processing only input events passed through the filtering by an enrichment process; and analysing the data received from the enrichment process for generating a security related decision.

19 Claims, 3 Drawing Sheets

(56) References Cited

U.S. PATENT DOCUMENTS

| | | | |
|---|---|---|---|
| 2016/0156642 A1* | 6/2016 | Kouznetsov | G06F 21/552 726/23 |
| 2017/0085588 A1* | 3/2017 | Laidlaw | H04L 63/1466 |
| 2018/0081913 A1* | 3/2018 | Suleiman | G06N 7/005 |
| 2018/0089272 A1* | 3/2018 | Bath | G06F 16/8373 |
| 2018/0167402 A1* | 6/2018 | Scheidler | G06N 20/00 |
| 2018/0219888 A1* | 8/2018 | Apostolopoulos | H04L 63/1425 |
| 2018/0227322 A1* | 8/2018 | Luo | H04L 63/1425 |
| 2019/0081969 A1* | 3/2019 | Phadke | H04L 63/1416 |
| 2019/0095817 A1* | 3/2019 | Ma | G06F 7/08 |
| 2019/0289007 A1* | 9/2019 | Zhang | H04L 63/08 |
| 2020/0153843 A1* | 5/2020 | Aksela | H04L 63/145 |
| 2020/0195679 A1* | 6/2020 | Du | H04W 12/122 |
| 2020/0201989 A1* | 6/2020 | Shu | G06F 21/577 |
| 2020/0204574 A1* | 6/2020 | Christian | H04L 63/12 |
| 2020/0213336 A1* | 7/2020 | Yu | G06N 3/08 |
| 2020/0396254 A1* | 12/2020 | Crabtree | G06F 16/2477 |
| 2020/0410001 A1* | 12/2020 | Sarkissian | G06F 3/0482 |
| 2021/0112077 A1* | 4/2021 | Huston, III | G06F 21/566 |
| 2021/0136121 A1* | 5/2021 | Crabtree | H04L 63/1433 |
| 2021/0176145 A1* | 6/2021 | Scheib | G06F 16/235 |
| 2021/0360032 A1* | 11/2021 | Crabtree | G06F 16/2477 |
| 2021/0377210 A1* | 12/2021 | Singh | G06F 21/73 |
| 2021/0385251 A1* | 12/2021 | Crabtree | G06F 16/951 |
| 2022/0014560 A1* | 1/2022 | Crabtree | H04L 63/1433 |
| 2022/0060512 A1* | 2/2022 | Crabtree | H04L 63/1425 |

\* cited by examiner

METHOD OF THREAT DETECTION IN A COMPUTER NETWORK SECURITY SYSTEM

CROSS-REFERENCE TO RELATED APPLICATIONS

This application claims benefit of United Kingdom Application No. 1903035.2 filed Mar. 7, 2019, which is hereby incorporated herein by reference in its entirety.

TECHNICAL FIELD

The present invention relates to a threat detection method and to an apparatus in a computer network security system.

BACKGROUND

Computer network security systems have started to become popular. An example of such is known as Endpoint Detection & Response (EDR) products and services. EDR focuses on the detection and monitoring of a breach as it occurs and after it occurs and helps to determine how best to respond. The growth of efficient and robust EDR solutions has been made possible in part by the emergence of machine learning, big data and cloud computing.

EDR or other corresponding systems deploy data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analysed and scanned by the EDR provider for signs of security breaches and anomalies.

A problem with EDR however is that the volume of data produced by the data collectors can be extremely large. Data volume is normally proportional to the activity occurring at a given EDR endpoint so when activity at that EDR endpoint is great, the produced data volume is also great. The immediate consequences of such large volumes of data are the following:

Decreased Quality of Service
  All of the data that the EDR backend receives needs to be processed and analysed. Whilst some of the data will be useful and possibly contain information indicative of a security breach, much of it is likely to be irrelevant for security purposes. In order to determine what data is or isn't useful, all of the data received by the EDR backend needs to be processed and analysed first. The practical consequence of this is that there is an inherent time delay between observation by the data collectors and reaction by the EDR provider and its security teams. It also means that the data used by the security teams to make decisions will not be as recent as possible as it is subject to the processing and analysing time delay. If security teams do not have current data, it becomes much more difficult to react effectively to potential signs of a breach. It also makes it much easier for a skilled malicious actor to cover up his tracks as he will always be two steps ahead.
Increased Cost of Service
  Despite the benefits of ever-improving cloud computing platforms, there is a resource cost (and therefore monetary cost) associated with managing large volumes of data. When high volumes of data need to be processed and made available in a useable format, the associated resource overheads and monetary costs can in some cases be very large for the EDR provider, which in turn can increase the cost of providing EDR to customer organisations. Many organisations thus simply opt not to implement EDR and continue to rely solely on EPP (End Point Protection) solutions, which presents a security risk as they cannot protect the organization against advanced file-less threats.

Some EDR systems have proposed reducing the data overhead by being selective about what data is collected (i.e. a policy of selective data collection limitation). However, this solution is problematic because effective monitoring, detection and forensic analysis often requires as complete a data picture as possible. It is often not possible to know in advance what data will be required to monitor and track a malicious actor. Realising that key pieces of information were not collected can often put a stop to any investigation, rendering such EDR systems ineffective.

There is a need to reduce costs associated with managing large volumes of data and a need to improve the way in which data is collected and processed in the context of EDR systems while at the same time avoiding significant risks to threat detection capabilities. There is also a need to decrease resource consumption and scalability issues that are caused by the continuously increasing data growth.

SUMMARY

According to a first aspect of the invention there is provided a method of threat detection as specified in claim 1.

According to a second aspect of the invention, there is provided an apparatus in a computer network security system as specified in claim 11.

According to a third aspect of the invention, there is provided a computer program product comprising a computer storage medium having computer code stored thereon, which when executed on a computer system, causes the system to operate as a server according to the above second aspect of the invention.

DETAILED DESCRIPTION

Figure 1:
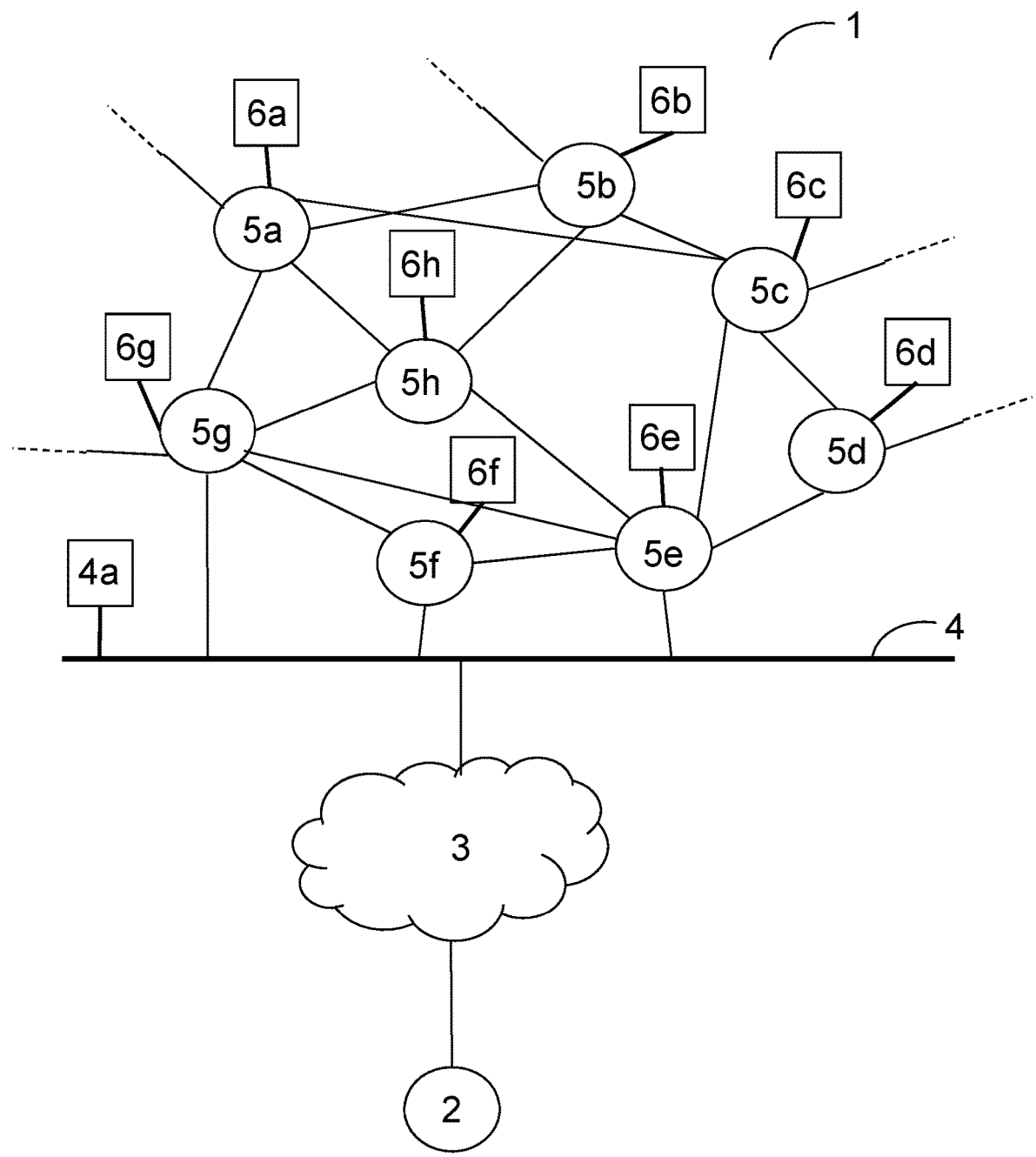
FIG. 1 illustrates schematically a network architecture.

FIG. 1 illustrates schematically a part of a first computer network 1 into which a computer system, for example an EDR system, has been installed. Also, any other computer system that is able to implement the embodiments of the invention can be used instead or in addition to the EDR system used in this example. The first computer network is connected to a security service network, here security backend/server 2 through the cloud 3. The backend/server 2 forms a node on the security service computer network relative to the first computer network. The security service computer network is managed by an EDR system provider and may be separated from the cloud 3 by a gateway or other interface (not shown) or other network elements appropriate for the backend 2. The first computer network 1 may also be separated from the cloud 3 by a gateway 4 or other interface. Other network structures are also envisaged.

The first computer network 1 is formed of a plurality of interconnected nodes 5a-5g, each representing an element in the computer network 1 such as a computer, smartphone, tablet, laptop, or other piece of network enabled hardware. Each node 5a-5g shown in the computer network also represents an EDR endpoint onto which a data collector (or "sensor") 6a-6g has been installed. Data collectors may also be installed on any other element of the computer network, such as on the gateway or other interface. A data collector 4a has been installed on the gateway 4 in FIG. 1. The data collectors, 6a-6h, 4a collect various types of data at the nodes 5a-5h or gateway 4 including, for example, program or file hashes, files stored at the nodes 5a-5h, logs of network traffic, process logs, binaries or files carved from memory (e.g. DLL, EXE, or memory forensics artefacts), and/or logs from monitoring actions executed by programs or scripts running on the nodes 5a-5h or gateway 4 (e.g. tcp dumps).

It is envisaged that any type of data which can assist in detecting and monitoring a security threat, such as malware, security breach or intrusion into the system, may be collected by the data collectors 6a-6h, 4a during their lifecycle and that the types of data which are observed and collected may be set according to rules defined by the EDR system provider upon installation of the EDR system or in response to instructions from the EDR backend 2. For example, the data collectors 6a-6h, 4a may collect data about the behaviour of programs running on an EDR endpoint and can observe when new programs are started. Where suitable resources are available, the collected data may be stored permanently or temporarily by the data collectors 6a-6h, 4a at their respective nodes or at a suitable storage location on the first computer network 1 (not shown).

The data collectors 6a-6h, 4a may also perform preliminary processing steps on the collected data limited by the computing and network resources available at each node 5a-5h or gateway 4.

The data collectors 6a-6h, 4a are set up such that they may send information such as the data they have collected or send and receive instructions to/from the EDR backend 2 through the cloud 3. This allows the EDR system provider to remotely manage the EDR system without having to maintain a constant human presence at the organisation which administers the first computer network 1.

Figure 2:
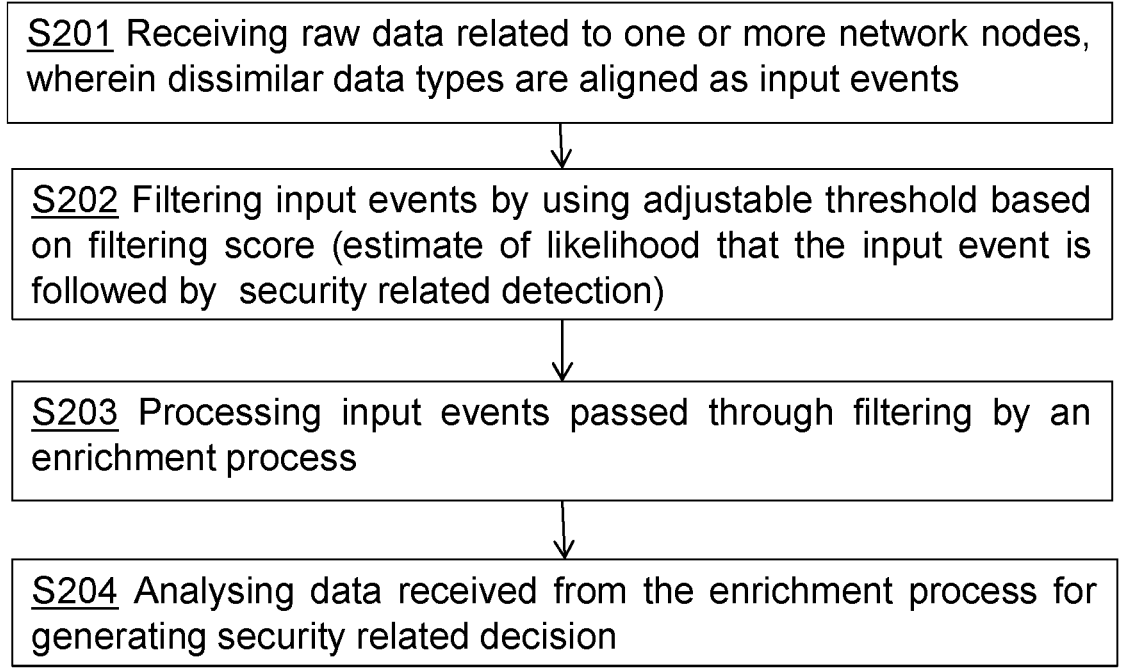
FIG. 2 is a flow diagram illustrating a method according to an embodiment.

FIG. 2 is a flow diagram illustrating a method according to an embodiment.

In S201, raw data is received/collected and aligned from plurality of network nodes (5a-5h), wherein dissimilar data types are aligned as input events. The raw submission processing components are responsible for an initial pre-processing of all data submission that are received from various kinds of endpoint sensors. The purpose of this is to make all dissimilar data types aligned such that the next level components of the data processing pipeline are able to interpret/deal with the data blocks (further referred to as events).

In S202, one or more of the input events are filtered by using an adjustable threshold that is based on a filtering score. The filtering score is an estimate of the likelihood that the input event is followed by a security related detection. In an embodiment, the filtering is implemented by an intelligent filtering module/component that may execute a machine learning model scoring a set of one or more input events to provide an estimate on the likelihood that the entire system would find a threat detection or a link to a detection based on the input event.

In an embodiment, the filtering score is a numerical score that can be given thresholds or sorted with. In an embodiment, one or more models predicting the output of the entire system based on raw input is built. This may be based on any one or more of: a self-learning rule set, a decision tree, a deep learning neural network or any other machine learning model. In an embodiment, based on the filtering score, an adjustable threshold is used for allowing only a number of events pass through filtering and entering the costly real-time processing. This enables maximizing the threat detection capabilities while at the same time controlling the balance between cost and coverage.

In an embodiment, the model or models are trained on the whole set of non-filtered data from a sample of the total input events. The sample size can vary depending on cost optimization, for example, but should be sufficiently large to expect reasonable coverage.

In an embodiment, an off-line processing may also be implemented to achieve optimal performance and limiting the risk of sacrificing detection capability. The off-line processing enables having a sample of data accessible without the requirement of having to push it through the on-line processing. This is beneficial due to the risk caused by a system being only able to learn from the data it sees, that is, new attack types would by default get filtered out until detections have been generated for them. In order to optimize resource usage and cost, instead of using an off-line processing (or in addition to it), the availability of a sufficient set of data for training the filtering models can also be performed via sampling of the input data streams. In such a model, a selected number of events that have been selected in a representative manner could bypass the filtering and be utilized for training the filtering and detection models from an unfiltered dataset.

In an embodiment, the filtering score is generated by a security server backend computer of a computer network. The security server backend may generate one or more filtering rules or models on the basis of the generated filtering score and these filtering rules or models are then deployed to one or more endpoints of the computer network.

In S203, the input events passed through filtering are processed in an event enrichment process. Also other processes, such as aggregation, may be used when preparing the data for analysis. The events prepared during the data processing steps require sometimes very selective processing that aims on expanding the input events into a form of fact that are interpretable and valuable for decision making components. In the aggregation process, for example, various pieces of content from input events may be used for forming new events (aggregated events). Information about the input events to support the creation of different views according to specific types of entities related to the input events may be aggregated. Usually the process of new events' preparation is carried out for describing general (activity) states for particular entity types (organizations, hosts, network segments, processes etc.) that are described by input events. In the enrichment process, the structure and context of input events is extended with already collected knowledge. The extended events (facts) are then passed to event analysis process.

In S204, data received from event enrichment process is analysed for generating a security related decision. An event analysis component used for the analysis may use any rules, heuristics, machine learning models etc. to analyse the facts received from the events enrichment process in order to find appropriate decisions and recommendations (detections) that positively impact state of the protected IT infrastructures in real time. In an embodiment, the event analysis component may provide a control channel for controlling the filtering process. The control channel enables a possibility to define a modifiable filtering model according to the requirements of the decision-making process.

Figure 3:
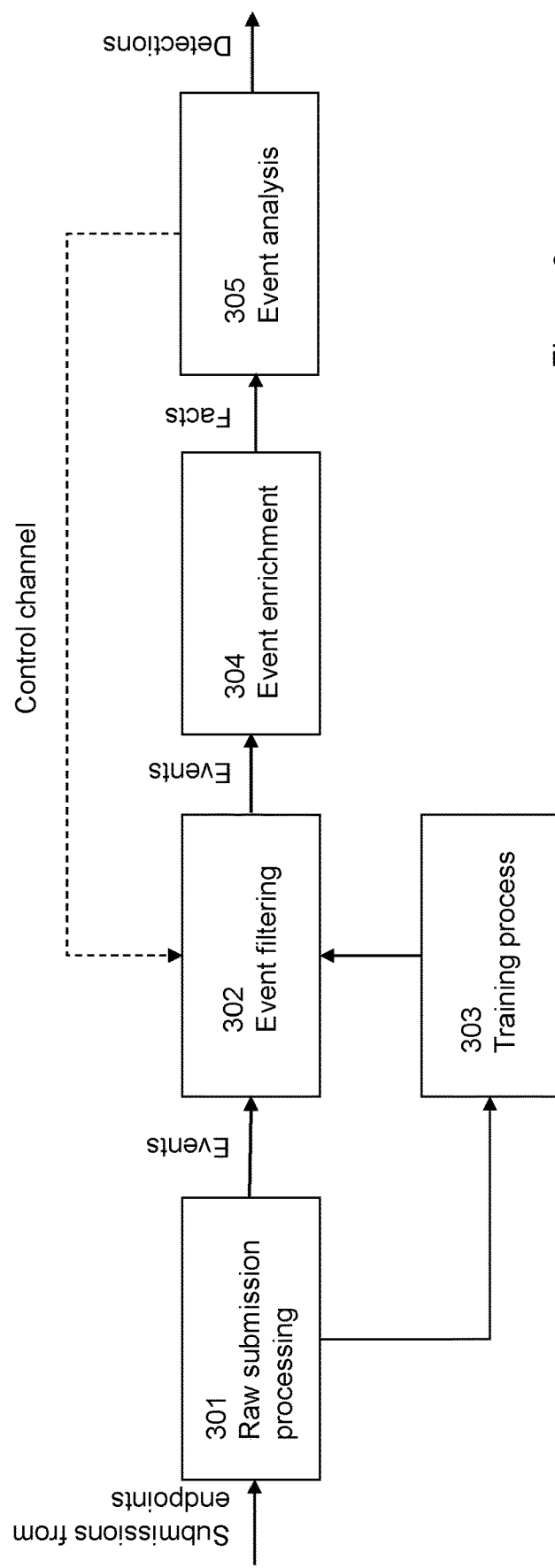
FIG. 3 is an example of a data processing flow according to an embodiment.

FIG. 3 is an example of a data processing flow according to an embodiment. The method steps described in relation to FIG. 2 are processed by the components illustrated in FIG. 3. The raw data from plurality of network nodes is processed (S201) at component 301. Event filtering component 302 is responsible for the input events filtering (S202). A training component 303 is responsible for training the model(s) used for the event filtering and/or event enrichment. Events enrichment component 304 takes care of event enrichment (S203) for the events received from the event filtering component 302. The training component 303 provides updates to the filtering models in use and/or new filtering models to ensure the process is optimal with regards to minimizing resource and cost usage and maximizing detection ability. Event analysis component 305 analyses (S204) the facts received from the event enrichment component 304 for generating security related decisions. The event analysis component 305 may also be configured to dynamically control a filtering logic/model on the basis of its analysis and send control commands to the event filtering component 302. The filtering of the input events is based on the filtering model/logic defining processes for at least one of: determining the filtering score determining an estimate of the likelihood that the input event is followed by a security related detection, determining essential elements of the passed through events required for the analysis, determining unnecessary elements of the passed through events to be culled.

If, based on the results from the events analysis component, a security threat is detected, further actions may be taken such as taking immediate action by changing the settings of the network nodes in order to ensure an attacker is stopped and any traces of their moves is not destroyed. Changing the settings may include, for example, one or more nodes (which may be computers or other devices) being prevented from being switched off in order to preserve information in RAM, a firewall may be switched on at one or more nodes to cut off the attacker immediately, network connectivity of one or more of the network nodes may be slowed down or blocked, suspicious files may be removed or placed into quarantine, logs may be collected from network nodes, sets of command may be executed on network nodes, users of the one or more nodes may be warned that a breach has been detected and that their workstation is under investigation, and/or a system update or software patch may be sent from the EDR backend 2 to the nodes in response to detecting a security threat. It is envisaged that one or more of these actions may be initiated automatically by the above-described algorithms. For example, using the above described methods, data has been collected and sent from the nodes in the computer network 1 to the EDR backend 2. The analysis algorithm has determined that a security threat was detected. As soon as the algorithm makes the determination that a security threat was detected, it may generate and issue a command to the related network nodes without human intervention to automatically initiate one or more of the above-described actions at the nodes. By doing this, a threat can be stopped and/or the damage minimised automatically at very high speeds and without human intervention.

Generally, the proposed approach introduces number of improvements to conventional EDR backend data processing pipeline schemes. Such improvements comprise, for example, improved filtering component that filters out events and/or wipes out unnecessary parts of events that do not need to be passed to the next elements of the pipeline. The default decision logic of the filtering component is to block and/or clean up events that are not likely to cause a detection.

In an embodiment, a control channel from the event analysis component to the event filtering component is used. This mitigates risks to delay the process of delivering potentially valuable information about the repeated events. In order to mitigate this risk, the control channel may be established to enable the analysis components (e.g. rules, machine learning models etc.) tuning the filtering logic.

In practise, first a more holistic data set may be collected from all client endpoints and then a filtering logic/model used in the filter component may be trained based on the collected data set. The trained logic may then be applied to the client endpoints so that the filtering is implemented on the endpoints to further minimize cost and bandwidth usage from transmitting the data to the backend.

Generally, as described above, the invention aims to overcome one of the critical problems of reducing the amount of data processed with minimal compromise to the detection accuracy for known or unknown threats. The embodiments of the invention provide a flexible, adaptive data selection approach that is driven fully by an analysis engine that is able to take advantage of machine learning, statistics, heuristics and any other decisional mechanisms. The embodiments of the invention also enable a flexible filtering of events together with the associated definition of filtering logic. The embodiments of the invention provide an integrated data processing pipeline with capabilities for both effective detection and data reduction.

The embodiments of the invention enable reducing costs due to data processing without significant risk to detection capabilities in EDR systems, for example. In order to build a sustainable security system without risking data collection, both costs and effectiveness are required to be in balance. An embodiment of the invention provides an adjustable parameter for controlling how much data is allowed through for keeping the process costs reasonable and while optimizing finding the most relevant data to process automatically.

Machine learning is here utilized for estimating the behaviour of the whole system when creating detections, including rules and other machine learning models. In an embodiment, it is not even necessary to achieve low false positive rates which is a problem in utilizing general machine learning approaches for detections, but since only for example a 100-1000 reduction in data volume is required to be achieved, false positives are not an issue and this makes the building of a large-scale model feasible. An objective could be, for example, to achieve near 100% accuracy with at most 1% data and thus the problem becomes more solvable. The use of machine learning avoids challenges of complex maintenance of rule bases which would be the default way to radically reduce data. Further, since the filtering may be implemented at the first stage of the backend process, it is possible, with reasonable costs, still store the data for the purposes of less cost-intensive off-line processing to ensure a system that is capable of detecting also novel attacks. This is something that the most radical filtering approaches are not able to achieve.

As described above, the nature of the model used by the EDR system may be, or may incorporate elements, from one or more of the following: a neural network trained using a training data set, exact or heuristic rules (e.g. hardcoded logic), fuzzy logic based modelling, and statistical inference-based modelling. The model may be defined to take into account particular patterns, files, processes, connections, and dependencies between processes.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of threat detection, the method comprising:
receiving raw data related to one or more network nodes, wherein dissimilar data types are aligned as input events;
filtering, based on a modifiable filtering model, one or more of the input events by using an adjustable threshold that is based on a filtering score, wherein the filtering score is an estimate of a likelihood that the input event is followed by a security related detection;
processing input events passed through the filtering by an enrichment process;
analysing the data received from the enrichment process for generating a security related decision for positive impact on a state of a protected Information Technology (IT) infrastructures in real time, said analysing the data comprises using at least one of the following processes for generating the security related decision: predetermined rules, heuristics, machine learning models, fuzzy logic based models, statistical inference based model; and said enrichment process comprises extending a structure and context of events with previously collected data based on analysing the data; and
controlling the modifiable filtering model based on analysis of the data based on at least one of said processes for generating the security related decision: predetermined rules, heuristics, machine learning models, fuzzy logic based models, statistical inference based model.

2. The method according to claim 1, wherein the filtering of the one or more of the input events is further based on one or more of: a self-learning rule set, a decision tree, a deep learning neural network or another machine learning model.

3. The method according to claim 2, wherein the machine learning model is trained on a set of data received from a plurality of network nodes.

4. The method according to claim 1, wherein the raw data is received, by a security server backend, from a plurality of network nodes of a computer network.

5. The method according to claim 1, wherein the raw data is received by a network node of a computer network.

6. The method according to claim 1, wherein the filtering of the input events is executed by a security server backend or by a network node of a computer network.

7. The method according to claim 1, further comprising: implementing an off-line process for separate analysis of unfiltered input events for ensuring optimal performance and detection capabilities for the threat detection and updating used machine learning model used to generate the filtering score regularly on a basis of a result of the separate analysis.

8. The method according to claim 1, further comprising: taking further action to secure the computer network and/or any related network node, wherein the further action comprises any one or more of:
preventing one or more of the network nodes from being switched off;
switching on a firewall at one or more of the network nodes;
slowing down or blocking network connectivity of one or more of the network nodes;
removing or placing into quarantine suspicious files;
collecting logs from network nodes;
executing sets of command on network nodes;
warning a user of one or more of the network nodes that signs of a security breach have been detected; and/or
sending a software update to one or more of the network nodes.

9. An apparatus in a computer network system comprising:
one or more processors and a memory comprising computer readable code which, when run on the one or more processors, causes the apparatus to:
receive raw data related to one or more network nodes, wherein dissimilar data types are aligned as input events;
filter, based on a modifiable filtering model, one or more of the input events by using an adjustable threshold that is based on a filtering score, wherein the filtering score is an estimate of a likelihood that the input event is followed by a security related detection;
process input events passed through the filtering by an enrichment process;
analyse the data received from the enrichment process for generating a security related decision for positive impact on a state of a protected Information Technology (IT) infrastructures in real time, wherein the data is analysed using at least one of the following processes for generating the security related decision: predetermined rules, heuristics, machine learning models, fuzzy logic based models, statistical inference based model; and said enrichment process comprises extending a structure and context of events with previously collected data based on analysing the data; and
control the modifiable filtering model based on analysis of the data based on at least one of said processes for generating the security related decision: predetermined rules, heuristics, machine learning models, fuzzy logic based models, statistical inference based model.

10. The apparatus according to claim 9, wherein the filtering of the one or more of the input events is further based on one or more of: a self-learning rule set, a decision tree, a deep learning neural network or another machine learning model.

11. The apparatus according to claim 10, wherein the machine learning model is trained on a set of data received from a plurality of network nodes.

12. The apparatus according to claim 9, wherein the raw data is received, by a security server backend, from a plurality of network nodes of the computer network.

13. The apparatus according to claim 9, wherein the raw data is received by a network node of a computer network.

14. The apparatus according to claim 9, wherein the filtering score is generated by a security server backend.

15. The apparatus according to claim 14, the processor being further configured to generate one or more filtering rules or models on a basis of the generated filtering score and to deploy the generated one or more filtering rules or models to one or more endpoints of the computer network.

16. The apparatus according to claim 9, wherein the filtering of the input events is executed by at least one of: a security server backend, a network node, an endpoint of a computer network.

17. The apparatus according to claim 9, the processor being further configured to: implement an off-line process for separate analysis of unfiltered input events for ensuring optimal performance and detection capabilities for and update used machine learning model used to generate the filtering score regularly on a basis of a result of the separate analysis.

18. The apparatus according to claim 9, the processor being further configured to: take further action to secure the computer network and/or any related network node, wherein the further action comprises any one or more of:
- preventing one or more of the network nodes from being switched off;
- switching on a firewall at one or more of the network nodes;
- slowing down or blocking network connectivity of one or more of the network nodes;
- removing or placing into quarantine suspicious files;
- collecting logs from network nodes;
- executing sets of command on network nodes;
- warning a user of one or more of the network nodes that signs of a security breach have been detected; and/or
- sending a software update to one or more of the network nodes.

19. A computer program product comprising a non-transitory computer readable medium storing a computer program comprising computer readable code which, when run on a computer system or server, causes the computer system or server to act as the apparatus according to claim 9.

* * * * *